United States Patent
Ito et al.

(10) Patent No.: US 10,626,778 B2
(45) Date of Patent: Apr. 21, 2020

(54) VEHICLE AND CONTROL METHOD FOR VEHICLE

(71) Applicant: TOYOTA JIDOSHA KABUSHIKI KAISHA, Toyota-shi, Aichi-ken (JP)

(72) Inventors: Katsuhiro Ito, Mishima (JP); Akira Mikami, Mishima (JP); Masaaki Sato, Susono (JP); Keishi Takada, Ashigarakami-gun (JP); Ryouhei Ono, Susono (JP); Edgar Yoshio Morales Teraoka, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/840,241

(22) Filed: Dec. 13, 2017

(65) Prior Publication Data
US 2018/0179942 A1   Jun. 28, 2018

(30) Foreign Application Priority Data
Dec. 26, 2016 (JP) ................ 2016-251588

(51) Int. Cl.
  *F01N 3/00* (2006.01)
  *F01N 9/00* (2006.01)
  (Continued)

(52) U.S. Cl.
  CPC ........ *F01N 9/002* (2013.01); *B01D 46/0063* (2013.01); *B01D 46/0086* (2013.01); *B01D 46/4263* (2013.01); *B01D 46/448* (2013.01); *B60W 30/192* (2013.01); *B60W 50/12* (2013.01); *F01N 3/027* (2013.01);
  (Continued)

(58) Field of Classification Search
  CPC ........ F01N 9/002; F01N 3/0238; F01N 3/027; B01D 46/0063; B01D 46/0086; B01D 46/4263; B01D 46/448; B60W 30/192; B60W 50/12; F02D 41/029; F02D 41/062; F02D 41/22; F02N 11/0803
  USPC .......... 123/672, 676, 697; 60/274, 286, 295, 60/298, 320
  See application file for complete search history.

(56) References Cited

U.S. PATENT DOCUMENTS

| | | | |
|---|---|---|---|
| 8,707,684 B2 * | 4/2014 | Gonze | F01N 3/0231 60/274 |
| 2004/0226287 A1 * | 11/2004 | Edgar | F01N 3/023 60/295 |
| 2015/0285161 A1 * | 10/2015 | Ulrey | F02D 21/04 477/3 |

FOREIGN PATENT DOCUMENTS

| | | |
|---|---|---|
| EP | 2 889 462 A1 | 7/2015 |
| JP | 58-126231 U | 8/1983 |

(Continued)

OTHER PUBLICATIONS

U.S. Appl. No. 15/840,137, filed Dec. 13, 2017.
U.S. Appl. No. 15/845,029, filed Dec. 18, 2017.

*Primary Examiner* — Hai H Huynh
*Assistant Examiner* — Gonzalo Laguarda
(74) *Attorney, Agent, or Firm* — Finnegan, Henderson, Farabow, Garrett & Dunner, LLP

(57) ABSTRACT

When a user requests start-up of an internal combustion engine while PM removal control is in execution or immediately after execution of the PM removal control is completed, an electronic control unit informs the user of the vehicle of a first alarm, so that the user recognizes that the internal combustion engine cannot be started up immediately. This makes it possible to suppress the discomfort caused because the internal combustion engine is not started up.

9 Claims, 5 Drawing Sheets

(51) Int. Cl.
*F01N 3/023* (2006.01)
*B60W 50/12* (2012.01)
*B01D 46/00* (2006.01)
*B01D 46/42* (2006.01)
*B01D 46/44* (2006.01)
*F01N 3/027* (2006.01)
*B60W 30/192* (2012.01)
*F02D 41/02* (2006.01)
*F02N 11/08* (2006.01)
*F02D 41/06* (2006.01)
*F02D 41/22* (2006.01)

(52) U.S. Cl.
CPC ......... *F01N 3/0238* (2013.01); *F02D 41/029* (2013.01); *F02D 41/062* (2013.01); *F02D 41/22* (2013.01); *F02N 11/0803* (2013.01); *B01D 2279/30* (2013.01); *B60W 2510/06* (2013.01); *B60W 2710/06* (2013.01); *F01N 2240/16* (2013.01); *F01N 2260/022* (2013.01); *F01N 2900/0418* (2013.01); *F01N 2900/0421* (2013.01); *F01N 2900/08* (2013.01); *F01N 2900/10* (2013.01); *F01N 2900/1602* (2013.01); *F02D 2041/228* (2013.01); *Y02T 10/47* (2013.01)

(56) References Cited

FOREIGN PATENT DOCUMENTS

| | | |
|---|---|---|
| JP | 59-007721 A | 1/1984 |
| JP | 07-063044 A | 3/1995 |
| JP | 7-71229 | 3/1995 |
| JP | 07-083024 A | 3/1995 |
| JP | 2009-203934 A | 9/2009 |

* cited by examiner

VEHICLE AND CONTROL METHOD FOR VEHICLE

INCORPORATION BY REFERENCE

The disclosure of Japanese Patent Application No. 2016-251588 filed on Dec. 26, 2016 including the specification, drawings and abstract is incorporated herein by reference in its entirety.

BACKGROUND

1. Technical Field

The present disclosure relates to a vehicle having a filter that collects particulate matter contained in exhaust gas discharged from an internal combustion engine, and a control method for the vehicle.

2. Description of Related Art

For a vehicle having a filter disposed in an exhaust passage for collecting particulate matter (PM), a technique for executing PM removal control has conventionally been known (see, for example, Japanese Patent Application Publication No. 7-71229). The PM removal control is configured to heat the filter so as to oxidize and thereby remove the PM when the amount of PM accumulated on the filter is equal to or above a specified amount and when a compression ignition-type internal combustion engine using diesel fuel is stopped. In JP 7-71229 A, when the PM removal control is interrupted for some reason, start-up of the internal combustion engine is prohibited until at least one of the following conditions is satisfied: prescribed time elapses; and temperature of the filter becomes below a specified temperature.

SUMMARY

When the internal combustion engine is stopped, and the PM removal control is in execution or immediately after the execution of the PM removal control is completed, the filter is at high temperature. In this case, if the internal combustion engine is, for example, a compression ignition-type internal combustion engine using diesel fuel, which burns fuel at an air-fuel ratio larger than a stoichiometric air-fuel ratio at the start-up, a large amount of oxygen is supplied to the filter upon start-up of the engine. Accordingly, an oxidation reaction of the PM remaining in the filter is promoted, which may cause the filter to be overheated. To avoid the overheating of the filter, when the PM removal control is in execution while the internal combustion engine is stopped, or immediately after the PM removal control is completed, it is considered to prohibit the start-up of the internal combustion engine until at least one of the following conditions is satisfied: prescribed time elapses; and the temperature of the filter becomes below a specified temperature.

However, when a user attempts to start up the internal combustion engine during execution of the PM removal control or immediately after completion of the PM removal control while the internal combustion engine is stopped without recognizing that the PM removal control is in execution, the user may feel discomfort since the internal combustion engine may not start up immediately.

The present disclosure suppresses the discomfort of a user in a vehicle having a filter in an exhaust passage, the vehicle being configured to execute PM removal control while the internal combustion engine is stopped, the discomfort of the user being caused because the internal combustion engine is not started up when start-up of the internal combustion engine is requested while the PM removal control is in execution or immediately after the PM removal control is completed.

A first aspect of the present disclosure is a vehicle. The vehicle includes: a filter disposed in an exhaust passage that carries an exhaust gas discharged from an internal combustion engine, the filter being configured to collect particulate matter contained in the exhaust gas; an electronic control unit configured to execute PM removal control that removes the particulate matter accumulated on the filter while the internal combustion engine is stopped; and an alarm informing device configured to inform a user of the vehicle of a first alarm when the electronic control unit determines that the user requests start-up of the internal combustion engine in a period from execution of the PM removal control to a lapse of a prescribed time after completion of the PM removal control.

The filter is at high temperature during execution of the PM removal control, or immediately after completion of the execution. Accordingly, when the internal combustion engine is started up within the period from the execution of the PM removal control to the lapse of the prescribed time after completion of the execution of the PM removal control, an oxidation reaction of the PM accumulated on the filter may be promoted by a large amount of oxygen contained in the exhaust gas discharged from the internal combustion engine, which may cause the filter to be overheated even though the PM removal control is stopped. With the configuration, when the user makes a start-up request to start up the internal combustion engine during stop of the internal combustion engine, the first alarm is notified so that the user recognizes that the internal combustion engine cannot be started up immediately. This makes it possible to suppress the discomfort caused because the internal combustion engine is not started up. Here, the first alarm is configured to inform the user that the internal combustion engine 11 cannot be started up immediately.

In the vehicle disclosed, the electronic control unit may be configured to stop the PM removal control when the electronic control unit determines that the user of the vehicle requests the start-up of the internal combustion engine again after the alarm informing device informs the user of the vehicle of the first alarm and when the PM removal control is in execution.

Typically, the PM removal control is stopped after the PM accumulated on the filter is removed to some extent, and once the temperature of the filter is lowered, the internal combustion engine is started up. However, when the user attempts to start up the internal combustion engine again after the first alarm is informed, it can be presumed that the user wants to start up the internal combustion engine immediately. With the configuration, since the PM removal control is immediately stopped, a time before starting up the internal combustion engine can be reduced.

The vehicle disclosed may further include a cooling device that cools the filter. The electronic control unit may be configured to stop the PM removal control and may be configured to control the cooling device to lower the temperature of the filter.

With the configuration, lowering the temperature of the filter can suppress overheating of the filter even when the internal combustion engine is started up. Accordingly, after the start-up of the internal combustion engine is requested and the PM removal control is stopped, the filter is cooled to lower the temperature of the filter. This makes it possible to further reduce the time before the internal combustion engine can be started up.

The vehicle may further include a temperature acquisition device that acquires the temperature of the filter. The electronic control unit may be configured to start up the internal combustion engine when the electronic control unit determines that the start-up of the internal combustion engine is requested after the PM removal control is stopped and after the temperature of the filter acquired by the temperature acquisition device is lowered below a specified temperature.

With the configuration, the internal combustion engine is started up when the temperature of the filter is lowered below the specified temperature, so that the overheating of the filter can be suppressed.

In the vehicle, the electronic control unit may be configured to execute the PM removal control by operation of the user of the vehicle while the internal combustion engine is stopped. The alarm informing device may be configured to inform the user of the vehicle of a second alarm when the electronic control unit executes the PM removal control.

With the configuration, in the case where the PM removal control is executed by the operation of the user, the second alarm informs the user in advance, upon start of the PM removal control, that it takes time before the internal combustion engine can be started up. Accordingly, the user recognizes that the internal combustion engine cannot be started up during execution of the PM removal control and immediately after completion of the execution. This makes it possible to suppress the discomfort of the user caused because the internal combustion engine is not started up.

A second aspect of the present disclosure is a control method for a vehicle. The vehicle includes: a filter disposed in an exhaust passage that carries an exhaust gas discharged from an internal combustion engine, the filter being configured to collect particulate matter contained in the exhaust gas; an electronic control unit configured to execute PM removal control that removes the particulate matter accumulated on the filter while the internal combustion engine is stopped; and an alarm informing device configured to inform a user of the vehicle of a first alarm. The control method includes the electronic control unit using the alarm informing device to inform the user of the vehicle of the first alarm when the electronic control unit determines that the user requests start-up of the internal combustion engine in a period from execution of the PM removal control to a lapse of a prescribed time after completion of the PM removal control.

In the above description, in order to assist understanding of the present disclosure, the component members of the disclosure corresponding to later-described embodiments are affixed with reference signs in parentheses, the reference signs being used in the embodiments. However, each of the component members of the present disclosure is not limited to the embodiments defined by the reference signs.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
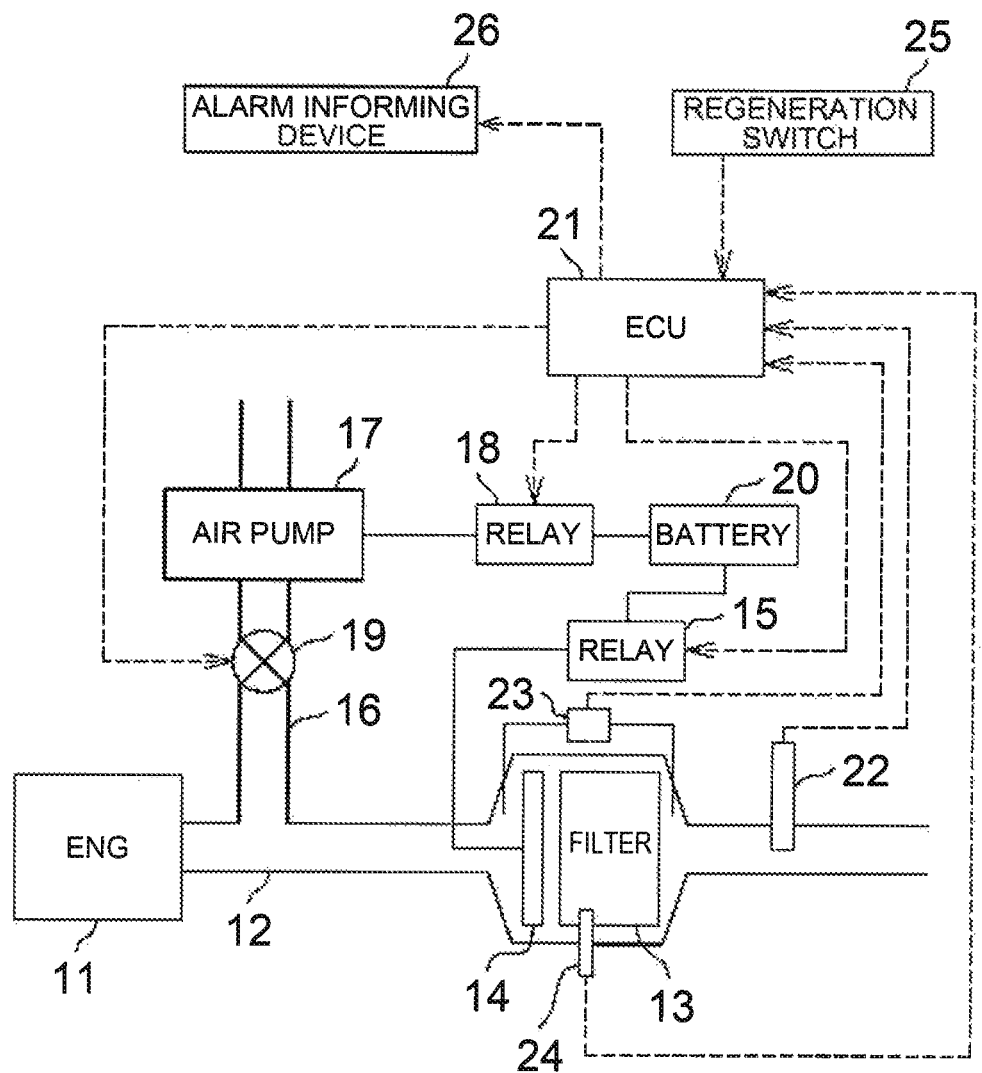
FIG. 1 is a schematic view of an exhaust gas system for a vehicle according to a first embodiment of the present disclosure.

As illustrated in FIG. 1, a vehicle 1 (referred to as "first vehicle" below) according to a first embodiment of the present disclosure includes an internal combustion engine 11. The internal combustion engine 11 is mounted on the first vehicle 1 as a driving source. The internal combustion engine 11 is a compression ignition-type internal combustion engine using diesel fuel. The internal combustion engine 11 may be configured to burn fuel at an air-fuel ratio larger than a stoichiometric air-fuel ratio at the time of start-up. The internal combustion engine 11 is connected to an exhaust passage 12 that releases the exhaust gas discharged from the internal combustion engine 11 to the air.

The first vehicle 1 includes a filter 13 that collects PM contained in the exhaust gas discharged from the internal combustion engine 11. The filter 13 is provided in the exhaust passage 12. The filter 13 is equipped with a heater 14 at its upstream end portion. The exhaust passage 12 is branched into an air supply pipe 16 on an upstream side of the heater 14. In the middle of the air supply pipe 16, an electro-magnetic valve 19 is disposed. The electro-magnetic valve 19 is configured to prevent backflow of the exhaust gas to an air supply channel during normal operation. The air supply pipe 16 is equipped with an air pump 17. When the electro-magnetic valve 19 is put in an opened state, and the air pump 17 is driven during stop of the internal combustion engine 11, air is supplied to the exhaust passage 12. Furthermore, when the heater 14 is energized with an electric current supplied from a battery which is not illustrated, the heater 14 generates heat, which removes the PM collected in the filter 13.

The first vehicle further includes an electronic control unit (referred to as ECU below) 21, as well as an exhaust passage temperature sensor 22, a differential pressure sensor 23, a filter temperature sensor 24, and a regeneration switch 25 described below. The ECU 21 is connected with the sensors and switch to receive signals from the sensors and switch. The heater 14 is connected with a battery 20 through a semiconductor relay 15. When the semiconductor relay 15 is opened and closed by a control signal from the ECU 21, energization of the heater 14 is controlled. The air pump 17 is connected with the battery 20 through a semiconductor relay 18. When the semiconductor relay 18 is opened and closed by a control signal from the ECU 21, a driving amount of the air pump 17 is controlled. The ECU 21 sends out an instruction signal to an unillustrated fuel injection valve of the internal combustion engine 11 to change the amount of fuel supplied to a combustion chamber of the internal combustion engine 11. The ECU 21 sends out an instruction signal to an unillustrated throttle valve to change the amount of intake air to the internal combustion engine 11. The ECU 21 is an electronic control circuit having a microcomputer as a main component part, the microcomputer including a central processing unit (referred to as CPU below), a ROM, a RAM, an interface. The CPU implements later-described various functions by executing routines stored in the ROM.

Hereinafter, a description is given of the sensors and switch from which the ECU 21 receives signals. The exhaust passage temperature sensor 22 is disposed downstream of the filter 13 to detect the temperature of the exhaust passage 12 and to output a signal representative of an exhaust passage temperature Tex. The differential pressure sensor 23 detects a pressure difference between upstream and downstream of the filter 13, and outputs a signal representative of a pressure difference dP. The filter temperature sensor 24 detects the temperature of the filter 13, and outputs a signal representative of a filter temperature Tf. The regeneration switch 25 is a switch provided in the first vehicle 1. When the user operates the regeneration switch 25, the regeneration switch 25 is switched between ON and OFF, and the regeneration switch 25 outputs an ON signal or an OFF signal. When the regeneration switch 25 is turned ON while the internal combustion engine 11 is stopped, the PM removal control is executed. The regeneration switch 25 is automatically turned OFF after the PM removal control is completed.

A description is now given of the operation of the CPU. The CPU repeatedly executes processing of a first control routine illustrated in FIG. 2, every time a prescribed time elapses. Therefore, when a prescribed timing comes, the CPU proceeds to processing of S101 to determine whether or not the PM removal control execution flag $X_s$ is "zero." Here, when the PM removal control flag $X_s$ is "1", the CPU determines that the PM removal control is in execution. When the PM removal control flag $X_s$ is "zero", the CPU determines that the PM removal control is not executed. When the PM removal control flag $X_s$ is "1", the CPU determines "NO" in S101, and proceeds to processing of S108. In S108, a PM removal control start alarm is put in a non-display state, and the present routine is temporarily terminated. The PM removal control start alarm will be described later in processing of S105. Here, putting the PM removal control start alarm in the non-display state refers to cancelling display of the PM removal control start alarm when the alarm is in a displayed state, and refers to continuing the non-display state when the PM removal control start alarm is not displayed. When the PM removal control flag $X_s$ is "zero", the CPU determines "YES" in S101, and proceeds to processing of S102. The PM removal control execution flag $X_s$ is set to "zero" at the start-up of the ECU 21.

In S102, the CPU determines whether or not a vehicle speed SPD is zero, i.e., whether or not the first vehicle 1 incorporating the internal combustion engine 11 is in a stopped state. When the vehicle speed SPD is not zero, i.e., when the first vehicle 1 incorporating the internal combustion engine 11 is moving, the CPU determines "NO" in S102, and temporarily terminates the present routine. When the vehicle speed SPD is zero, i.e., when the first vehicle 1 incorporating the internal combustion engine 11 is in the stopped state, the CPU determines "YES" in S102, and proceeds to processing of S103.

In S103, the CPU determines whether or not the speed NE of the internal combustion engine 11 is zero, i.e., whether or not the internal combustion engine 11 is in the stopped state. When the speed of the internal combustion engine 11 is not zero, i.e., when the internal combustion engine 11 is not in the stopped state, the CPU determines "NO" in S103, and temporarily terminates the present routine. When the speed of the internal combustion engine 11 is zero, i.e., when the internal combustion engine 11 is in the stopped state, the CPU determines "YES" in S103, and proceeds to processing of S104.

In S104, the CPU determines whether or not the regeneration switch 25 is turned ON. When the regeneration switch 25 is turned OFF, it can be determined that the user does not request the PM removal control. Hence, the CPU determines "NO" in S104, and temporarily terminates the present routine. When the regeneration switch 25 is turned ON, it can be determined that the user requests the PM removal control. Hence, the CPU determines "YES" in S104, and proceeds to processing of S105.

In S105, the CPU starts to display a PM removal control start alarm (one example of the "second alarm" in SUMMARY). The PM removal control start alarm is displayed on the alarm informing device 26, for example, a multi-information display, to inform the user of a content of the alarm including "the internal combustion engine cannot be started up for a while." Then, the CPU proceeds to processing of S106 to execute PM removal control. Here, the PM removal control is executed such that electric power is supplied from the battery 20 to the heater 14 to heat the heater 14, while electric power is supplied from the battery 20 to the air pump 17 to supply air to the exhaust passage 12. In that case, the amount of electric power to the air pump 17 is controlled such that a supply flow rate P of air supplied by the air pump 17 becomes a first supply flow rate P1. The CPU then proceeds to processing of S107 to set the PM removal control execution flag $X_s$ to "1", and temporarily terminates the present routine.

Figure 2:
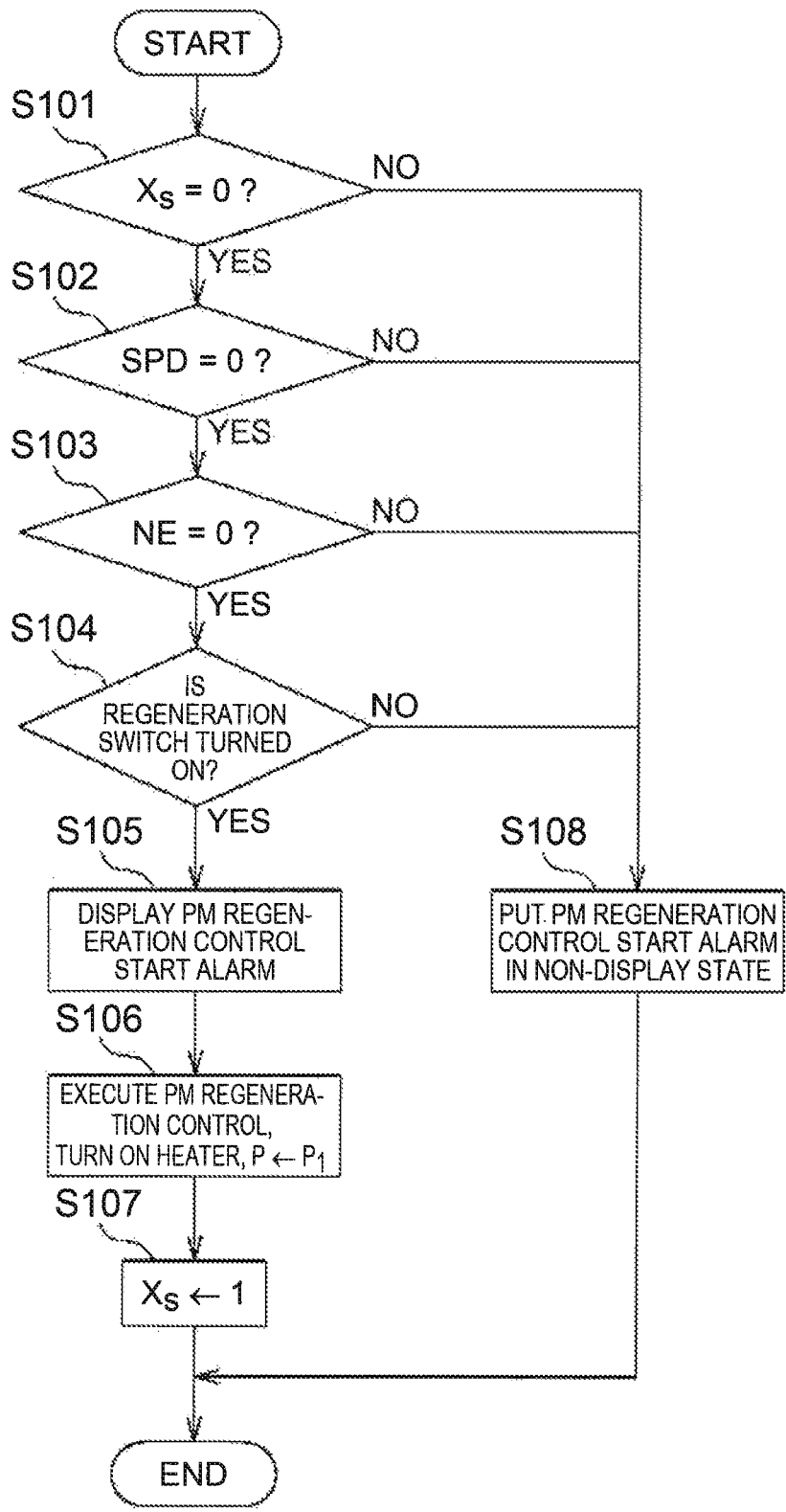
FIG. 2 is a flowchart illustrating a routine executed by an ECU illustrated in FIG. 1.
Figure 3:
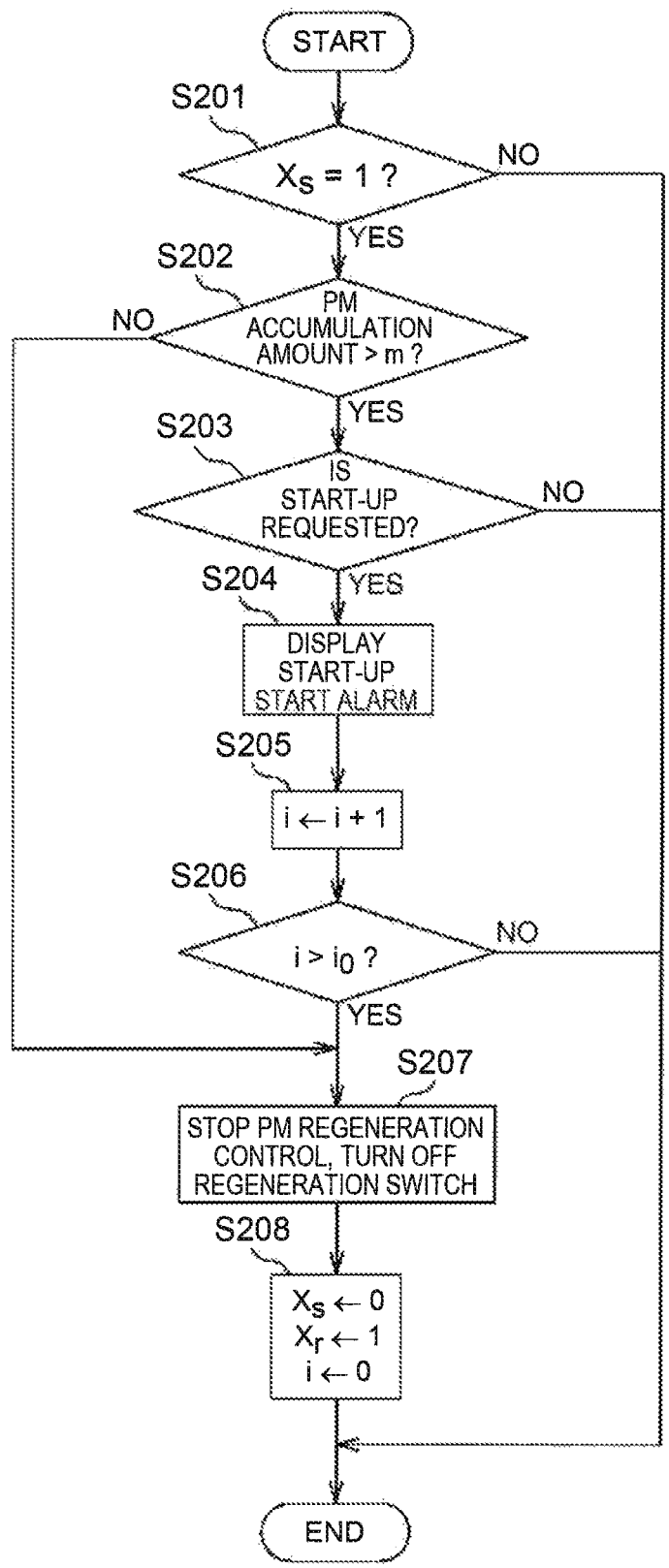
FIG. 3 is a flowchart illustrating a routine executed by the ECU illustrated in FIG. 1.

Furthermore, in parallel to the first control routine illustrated in FIG. 2, the CPU repeatedly executes a second control routine illustrated in FIG. 3, every time a prescribed time elapses. Therefore, when a prescribed timing comes, the CPU proceeds to processing of S201 to determine whether or not the PM removal control execution flag $X_s$ is "1." When the PM removal control execution flag $X_s$ is "zero", the CPU determines "NO" in S201, and temporarily terminates the present routine. When the PM removal control execution flag $X_s$ is "1", the CPU determines "YES" in S201, and proceeds to processing of S202.

In S202, the CPU determines whether or not the amount of PM accumulated on the filter 13 is larger than an accumulation amount m. When the amount of PM accumulated on the filter 13 is larger than the accumulation amount m, the CPU determines "YES" in S202, and proceeds to processing of S203.

In S203, the CPU determines whether or not the start-up of the internal combustion engine 11 is requested by user operation. Here, the start-up request of the internal combustion engine 11 by the user operation refers to execution of operation to start up the internal combustion engine, such as insertion of an ignition key, and turning on an unillustrated switch for starting up the internal combustion engine 11. When the start-up of the internal combustion engine 11 is not requested by the user operation, the CPU determines "NO" in S203, and temporarily terminates the present routine. When the start-up of the internal combustion engine 11 is requested by the user operation, the CPU determines "YES" in S203, and proceeds to processing of S204.

In S204, the CPU starts to display, for the user, a start-up start alarm (one example of the "first alarm" in SUMMARY). Here, the start-up start alarm is displayed on, for example, a multi-information display, to inform the user of a content of the alarm including "the internal combustion engine 11 cannot be started up immediately." The start-up start alarm may inform the content such as "PM removal control is in execution", and "PM removal control is prioritized." Here, as for the start-up start alarm, the content of the alarm to be informed may be changed depending on an alarm number-of-times counter i described in S205. For example, when the alarm number-of-times counter i is "1", the content to be informed includes "Internal combustion engine 11 cannot be started up immediately." When the alarm number-of-times counter i is "2", the content to be informed includes "Do you want to stop PM removal control and start up internal combustion engine 11?" When the alarm number-of-times counter i is "3", the content to be informed includes "PM accumulated on the filter 13 is not sufficiently removed. Do you really want to start up internal combustion engine 11?"

Then, the CPU proceeds to processing of S205, where a value obtained by incrementing a previous value of the alarm number-of-times counter i by "1" is substituted in the alarm number-of-times counter i. Here, the alarm number-of-times counter i represents the number of times of informing the user of the alarm, when the start-up of the internal combustion engine is requested by the user operation while the PM removal control is in execution. Then, the CPU proceeds to processing of S206 to determine whether or not the alarm number-of-times counter i is larger than a specified value i0. When the alarm number-of-times counter i is equal to or below the specified value i0, the CPU determines "NO" in S206, and temporarily terminates the present routine. When the alarm number-of-times counter i is larger than the specified value i0, the CPU determines "YES" in S206, and proceeds to processing of S207. The alarm number-of-times counter i is set to "zero" at the start-up of the ECU 21.

In S207, the CPU stops the PM removal control, and the regeneration switch 25 is automatically turned OFF. Here, stopping the PM removal control refers to stopping electric power supply from the battery to the heater 14 to stop heating of the heater 14. When the alarm number-of-times counter is larger than the specified value i0, it can be determined that the user requests the start-up of the internal combustion engine 11 in priority to the PM removal control. Accordingly, in this case, priority is given to the start-up of the internal combustion engine 11 over the PM removal control. Then, the CPU proceeds to processing of S208 to set the PM removal control execution flag $X_s$ to "zero", set a filter cooling flag $X_r$ to "1", and further set the alarm number-of-times counter i to "zero." The CPU then temporarily terminates the present routine. The filter cooling flag $X_r$ is a flag representing whether or not to execute control of cooling the filter 13. A description thereof will be given later with reference to FIG. 4. The PM removal control execution flag $X_s$ is set to "zero" at the start-up of the ECU 21.

When the amount of PM accumulated on the filter 13 is equal to or below the accumulation amount m in S202, the CPU determines "NO", and proceeds to processing of S207 to execute the aforementioned operation.

Figure 4:
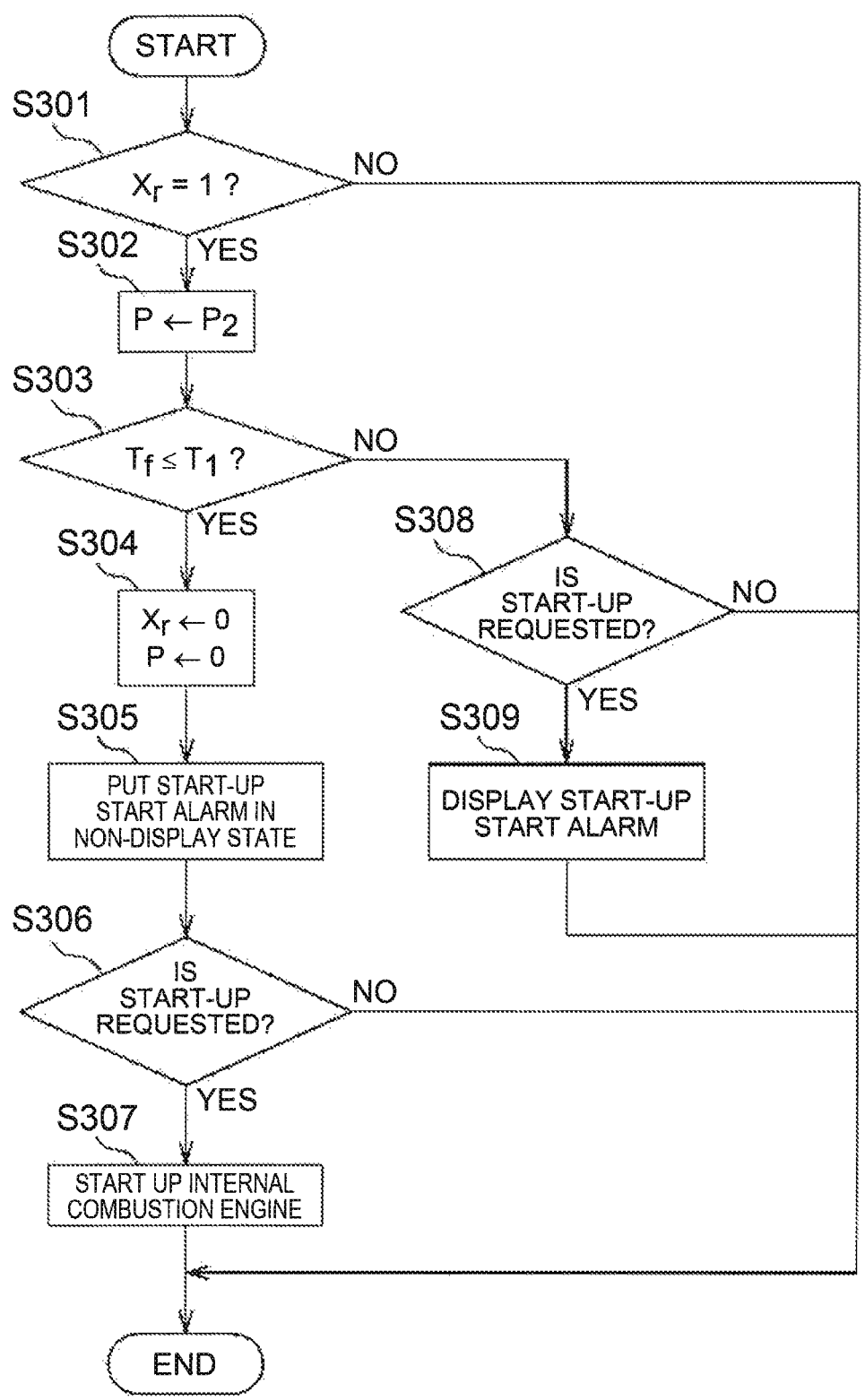
FIG. 4 is a flowchart illustrating a routine executed by the ECU illustrated in FIG. 1.

Furthermore, in parallel to the first control routine illustrated in FIG. 2 and the second control routine illustrated in FIG. 3, the CPU repeatedly executes a third control routine illustrated in FIG. 4, every time a prescribed time elapses. Therefore, when a prescribed timing comes, the CPU proceeds to processing of S301 to determine whether or not the filter cooling flag $X_r$ is "1." When the filter cooling flag $X_r$ is "zero", the CPU determines "NO" in S301, and temporarily terminates the present routine. When the filter cooling flag $X_r$ is "1", the CPU determines "YES" in S301, and proceeds to processing of S302.

In S302, the CPU controls the amount of electric power to the air pump 17 such that the supply flow rate P of air supplied by the air pump 17 becomes a second supply flow rate P2, and proceeds to processing of S303. Here, the second supply flow rate P2 is a flow rate which is larger than the first supply flow rate P1 set in S105 illustrated in FIG. 2 and which is small enough to prevent the filter 13 from overheating. When the filter 13 is still at high temperature after the PM removal control is stopped, and the supply flow rate of air supplied by the air pump 17 is too large, there is a possibility that an oxidation reaction of PM is promoted and thereby the filter 13 is overheated. Accordingly, the second supply flow rate P2 is set to a supply flow rate small enough to prevent the filter 13 from overheating. When the supply flow rate of air supplied by the air pump 17 is increased, a larger amount of heat can be released from the filter 13, and therefore the temperature of the filter 13 can be lowered at a higher rate.

In S303, the CPU determines whether or not the temperature Tf of the filter 13 is equal to or below a specified temperature Tl. When the temperature Tf of the filter 13 is equal to or below the specified temperature Tl, it can be determined that the filter 13 is sufficiently cooled and there is little possibility that the filter 13 is overheated even when the internal combustion engine 11 is started up. As a consequence, the CPU determines "YES" in S303, and proceeds to processing of S304.

In S304, the CPU sets the filter cooling flag $X_r$ to "zero", while setting power supply to the air pump 17 to "zero" so as to set the supply flow rate P of air supplied by the air pump 17 to "zero." The CPU then proceeds to processing of S305.

In S305, the CPU puts the start-up start alarm in the non-display state, and proceeds to processing of S306. Here, putting the start-up start alarm in the non-display state refers to cancelling display of the start-up start alarm in the case where the alarm is in the displayed state, and refers to continuing the non-display state in the case where the start-up start alarm is not displayed.

In S306, the CPU determines whether or not a start-up request of the internal combustion engine 11 by user operation is present. When the start-up of the internal combustion engine 11 is not requested by the user operation, the CPU determines "NO" in S306, and temporarily terminates the present routine. When the start-up of the internal combustion engine 11 is requested by the user operation, the CPU determines "YES" in S306, and proceeds to processing of S307. In S307, the CPU starts up the internal combustion engine 11 and temporarily terminates the present routine.

When the temperature Tf of the filter 13 is larger than the specified temperature Tl, it can be determined that the filter 13 is not sufficiently cooled, and there is a high possibility that the filter 13 is overheated when the internal combustion engine 11 is started up. As a consequence, the CPU determines "NO" in S303, and proceeds to processing of S308.

In S308, the CPU determines whether or not a start-up request of the internal combustion engine 11 by the user operation is present. When the start-up request of the internal combustion engine 11 by the user operation is not present, the CPU determines "NO" in S308, and temporarily terminates the present routine. When the start-up of the internal combustion engine 11 is requested by the user operation, the CPU determines "YES" in S308, and proceeds to processing of S309. In S309, the CPU displays a start-up start alarm to inform the user of the content including "the internal combustion engine 11 cannot be started up immediately", and temporarily terminates the present routine. Here, displaying the start-up start alarm refers to starting to display the start-up start alarm when the start-up start alarm is in the non-display state, and refers to continuing the display state when the start-up start alarm is displayed.

As described in the foregoing, according to the first vehicle 1, the start-up start alarm is informed when the user makes a start-up request to start up the internal combustion engine 11 while the internal combustion engine 11 is stopped and while the PM removal control is in execution or immediately after the PM removal control is completed. Accordingly, the user can recognize that the internal combustion engine 11 cannot be started up immediately, which can suppress the discomfort caused because the internal combustion engine 11 is not started up. Furthermore, the start-up start alarm informs the content such as "PM removal control is in execution", and "PM removal control is prioritized." Accordingly, the start-up request of the internal combustion engine 11 by the user can be suppressed, and sufficient removal of PM accumulated on the filter 13 can be achieved.

According to the first vehicle 1, the PM removal control is immediately stopped when the user attempts to start up the internal combustion engine 11 a plurality of times while the internal combustion engine 11 is stopped and after the start-up start alarm is informed. As a result, priority can be given to the start-up of the internal combustion engine 11 over the PM removal control, so that the time before starting up the internal combustion engine 11 can be reduced.

Furthermore, according to the first vehicle 1, the filter 13 is cooled until the temperature of the filter 13 is lowered below the specified temperature after the PM removal control is stopped. This makes it possible to further reduce the time before the internal combustion engine can be started up, while suppressing overheating of the filter 13 caused by the start-up of the internal combustion engine 11.

Furthermore, according to the first vehicle 1, when the PM removal control is started, the second alarm informs the user that it takes time until the internal combustion engine 11 can be started up. This makes it possible to suppress the attempt of the user to start up the internal combustion engine 11 while the PM removal control is in execution, and to suppress the discomfort of the user caused because the internal combustion engine 11 is not started up.

A description is now given of a vehicle (referred to as "second vehicle" below according to a second embodiment of the present disclosure. The second vehicle is different from the first vehicle only in the point that the CPU executes a routine illustrated in FIG. 5 in place of the routine illustrated in FIG. 4. Specifically, the different point is such that in the first vehicle, the flow rate of air supplied by the air pump 17 is increased after the PM removal control is stopped, whereas in the second vehicle, the flow rate of air supplied by the air pump 17 is decreased after the PM removal control is stopped. Hereinafter, the point of difference will mainly be described.

Figure 5:
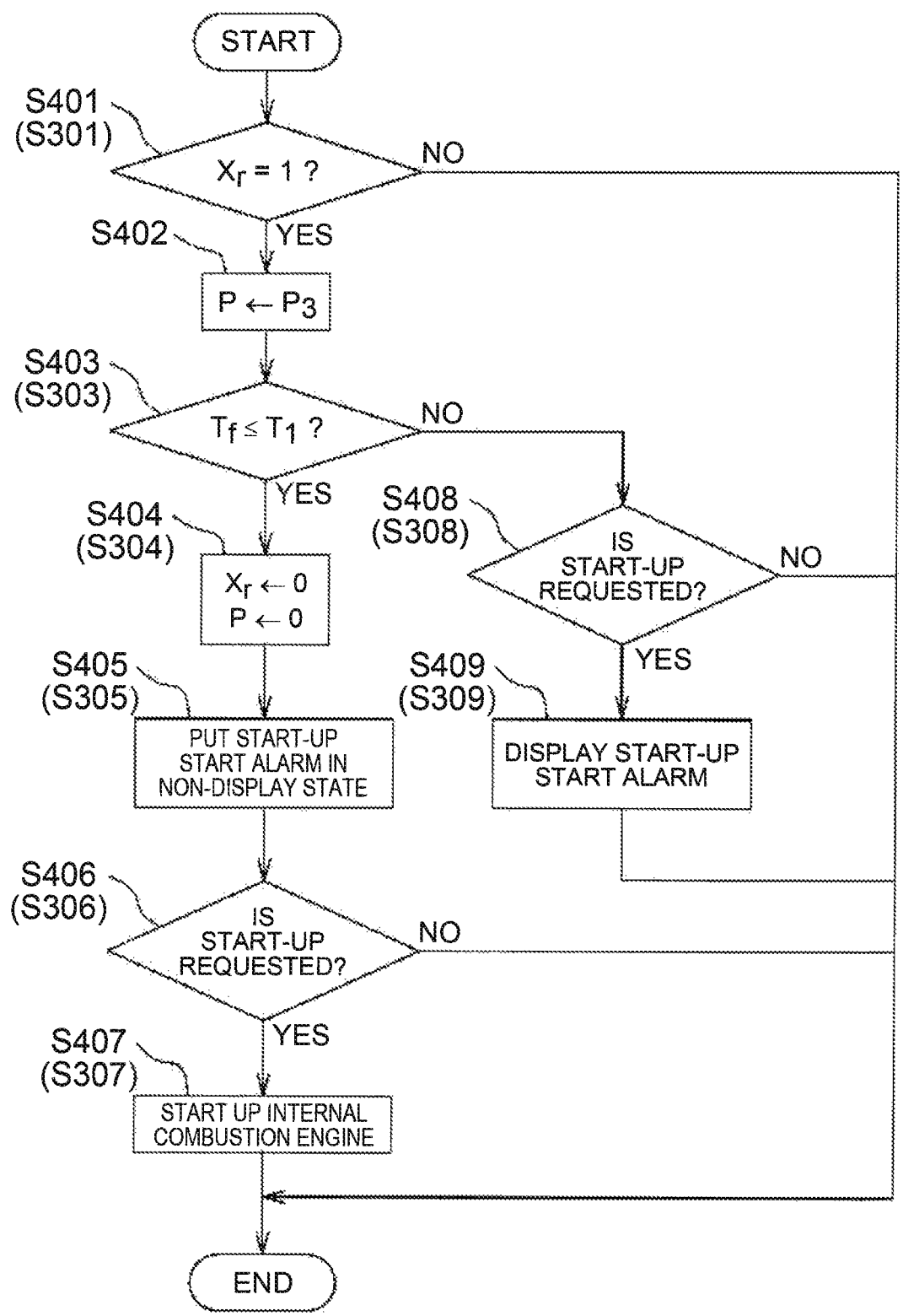
FIG. 5 is a flowchart illustrating a routine executed by an ECU according to a second embodiment of the present disclosure.

In the second vehicle, steps S401 through S407 in the routine illustrated in FIG. 5 are the steps, except for S402, that perform the processing same as the processing of S301 through S307 in the routine illustrated in FIG. 4. Among the steps illustrated in FIG. 5, the steps that perform the processing identical to those of the steps illustrated in FIG. 4 are affixed with reference signs in parentheses, the reference signs being illustrated in FIG. 4. Accordingly, for example, S401 (S301) in FIG. 5 indicates that S401 is the step that performs the processing same as S301. Hereinafter, a description is mainly given of the processing of "S402" that is peculiar to the routine illustrated in FIG. 5.

In S402, the CPU controls the amount of electric power to the air pump 17 such that the supply flow rate P of air supplied by the air pump 17 becomes a third supply flow rate P3. The CPU then proceeds to processing of S403. Here, the third supply flow rate P3 is a flow rate smaller than the first supply flow rate P1 set in S105. The third supply flow rate P3 includes a supply flow rate of air defined as zero. When the filter 13 has a large thermal capacity, the filter 13 may be maintained at high temperature for a while even though the PM removal control is stopped and so the heating means is stopped. Accordingly, when the supply flow rate of air supplied by the air pump 17 after the stop of the PM removal control is equal to the supply flow rate during execution of the PM removal control, there is a possibility that the oxidation reaction of PM may continue and the filter 13 may be overheated. Therefore, in S403, the CPU sets the supply flow rate P of air supplied by the air pump 17 to the flow rate P3 which is smaller than the first supply flow rate P1.

As described in the foregoing, according to the second vehicle, a driving amount of the air pump after the stop of the PM removal control is decreased. When the driving amount of the air pump after the stop of the PM removal control is decreased, the amount of oxygen flowing into the filter decreases. Accordingly, the PM oxidation reaction in the filter can be suppressed, and overheating of the filter can be suppressed. When the air pump 17 is continuously driven, while the driving amount of the air pump after the stop of the PM removal control is decreased, not only the effect of stopping the driving of the air pump after the stop of the PM removal control is exhibited, but also a flow of gas, such as a flow of gas passing through the filter, is generated. As a result, the amount of heat transfer to the gas passing through the filter can be increased, so that the filter 13 can be cooled. This makes it possible to suppress the overheating of the filter at the start-up of the internal combustion engine 11.

In the first vehicle and the second vehicle, the temperature of the filter 13 is raised by heating the filter 13 with the heater 14 used as heating means. However, the heating means may be other than the heater 14 as long as the temperature of the filter 13 is raised. For example, in place of the heater 14, a fuel addition valve and a fuel ignition device may be provided in a portion of the exhaust passage upstream of the filter 13. A fuel may be added from the fuel addition valve, and be ignited by the fuel ignition device to raise the temperature of the exhaust gas supplied to the filter 13 and to thereby raise the temperature of the filter 13. Here, the fuel ignition device refers to a glow plug or an ignition device. The heater 14 may be replaced with a microwave generator, which irradiates the filter 13 with a microwave to raise the temperature of the filter 13. Furthermore, an electric heating-type filter may be used as the filter 13, and the temperature of the filter 13 may be raised by applying an electric current to the filter 13.

In the first vehicle and the second vehicle, the flow rate of the air pump is changed to cool the filter 13 after the PM removal control is stopped. However, the filter 13 may be cooled by other means. For example, a supply channel that supplies a gas may be provided separately from the air supply pipe 16. The gas supplied from the supply channel is fed into the filter 13 to increase the amount of heat transfer to the gases passing through the filter 13 for cooling the filter 13. Furthermore, a coolant channel may be provided to circulate a coolant around the filter 13. When the temperature of the filter 13 is above the specified temperature Tl after the PM removal control is stopped, the coolant may be circulated through the coolant channel to cool the filter 13. Furthermore, supply means may be provided to supply a liquid to the filter 13. When the temperature of the filter 13 is above the specified temperature Tl after the PM removal control is stopped, the liquid may be injected to the filter 13 such that the liquid is evaporated to generate heat of evaporation, which may cool the filter 13.

In the first vehicle and the second vehicle, the PM removal control starts to be executed using the regeneration switch 25. However, the PM removal control may be configured to be automatically executed regardless of user's intention while the internal combustion engine 11 is stopped. In the case of the vehicle that automatically executes the PM removal control, the start-up start alarm may be informed when the user makes a start-up request to start up the internal combustion engine 11 while the PM removal control is in execution or immediately after the PM removal control is completed. Accordingly, the user can recognize that the internal combustion engine 11 cannot be started up immediately, which can suppress the discomfort caused because the internal combustion engine 11 is not started up.

In the first vehicle and the second vehicle, the accumulation amount of PM accumulated on the filter 13 is acquired using the differential pressure sensor 23. However, the method for acquiring the accumulation amount of PM accumulated on the filter 13 is not limited thereto. For example, the accumulation amount of PM accumulated on the filter 13 may be acquired based on driving time of the internal combustion engine 11 after the last execution of the PM removal control or based on a driving distance of the vehicle after the last execution of the PM removal control. Furthermore, the accumulation amount of PM accumulated on the filter 13 may be acquired by calculating the amount of PM discharged from the internal combustion engine 11 due to the load of the internal combustion engine 11.

In the first vehicle and the second vehicle, the air pump 17 is used as air supply means. However, other means may be used for supplying air to the filter 13. For example, the air supply means may be an electric supercharger provided in an intake passage which is not illustrated. The intake passage is branched into a bypass channel on the downstream side of the electric supercharger, the bypass channel being connected to the exhaust passage 12 on the upstream side of the heater 14. When the PM removal control is executed, the electric supercharger is driven to generate an air flow in the intake passage. The air flow generated in the intake passage may partially be circulated to the bypass channel by opening a valve provided in the bypass channel, so that air is supplied to the filter 13.

In the first vehicle and the second vehicle, the multi-information display is used as means for informing the user of the PM removal control start alarm and the start-up start alarm. However, other means may be used as long as the alarms can be informed to the user. For example, the alarms may audibly be informed to the user.

In the first vehicle and the second vehicle, the internal combustion engine 11 is started up when the temperature Tf of the filter 13 is equal to or below the specified temperature Tl, and the start-up of the internal combustion engine 11 is requested by user operation. However, the internal combustion engine 11 may be started up when the start-up of the internal combustion engine 11 is requested by the user operation while the PM removal control is in execution or immediately after the execution of the PM removal control is completed, and then the temperature Tf of the filter 13 reaches the specified temperature Tl or below. In this case, the internal combustion engine 11 can be started up earlier than those of the first vehicle and the second vehicle. Therefore, the start-up request of the user can be satisfied more swiftly.

What is claimed is:

1. A vehicle, comprising:
a filter disposed in an exhaust passage that carries an exhaust gas discharged from an internal combustion engine, the filter being configured to collect particulate matter contained in the exhaust gas;
an electronic control unit configured to execute PM removal control that removes the particulate matter accumulated on the filter while the internal combustion engine is stopped;
an alarm informing device configured to inform a user of the vehicle of a first alarm when:
the electronic control unit determines that the user requests start-up of the internal combustion engine in a period from execution of the PM removal control to a lapse of a prescribed time after completion of the PM removal control, and
the electronic control unit determines that the amount of particulate matter accumulated on the filter is larger than a specified accumulation amount; and
a cooling device that cools the filter,
wherein the electronic control unit is configured to stop the PM removal control when the electronic control unit determines that the user of the vehicle requests the start-up of the internal combustion engine again after the alarm informing device informs the user of the vehicle of the first alarm and while the PM removal control is in execution, and
wherein the electronic control unit is configured to start the cooling device, after the PM removal control is stopped, to lower temperature of the filter.

2. The vehicle according to claim 1, further comprising a temperature acquisition device that acquires temperature of the filter,
wherein the electronic control unit is configured to start up the internal combustion engine when the electronic control unit determines that the start-up of the internal combustion engine is requested after the PM removal control is stopped and after the temperature of the filter acquired by the temperature acquisition device is lowered below a specified temperature.

3. The vehicle according to claim/herein
the electronic control unit is configured to execute the PM removal control by operation of the user of the vehicle while the internal combustion engine is stopped, and
the alarm informing device is configured to inform the user of the vehicle of a second alarm when the electronic control unit executes the PM removal control.

4. The vehicle according to claim 1, wherein
the electronic control unit is configured to execute PM removal control while the internal combustion engine is stopped and while the vehicle incorporating the internal combustion engine is stopped.

5. The vehicle according to claim 1, wherein
the prescribed time is a time when a temperature of the filter becomes below a specified temperature.

6. The vehicle according to claim 1, further comprising a temperature rising device that raises the temperature of the filter,
wherein the electronic control unit is configured to execute the PM removal control by controlling the temperature rising device to raise the temperature of the filter.

7. A control method for a vehicle,
the vehicle including a filter disposed in an exhaust passage that carries an exhaust gas discharged from an internal combustion engine, the filter being configured to collect particulate matter contained in the exhaust gas, an electronic control unit configured to execute PM removal control that removes the particulate matter accumulated on the filter while the internal combustion engine is stopped, an alarm informing device configured to inform a user of the vehicle of a first alarm, and a cooling device that cools the filter, the control method comprising:

informing, by the electronic control unit, the user of the vehicle of the first alarm using the alarm informing device when:
- the electronic control unit determines that the user requests start-up of the internal combustion engine in a period from execution of the PM removal control to a lapse of a prescribed time after completion of the PM removal control, and
- the electronic control unit determines that the amount of particulate matter accumulated on the filter is larger than a specified accumulation amount, wherein the electronic control unit is configured to stop the PM removal control when the electronic control unit determines that the user of the vehicle requests the start-up of the internal combustion engine again after the alarm informing device informs the user of the vehicle of the first alarm and while the PM removal control is in execution, and wherein the electronic control unit is configured to start the cooling device, after the PM removal control is stopped, to lower temperature of the filter.

8. A vehicle, comprising:

a filter disposed in an exhaust passage that carries an exhaust gas discharged from an internal combustion engine, the filter being configured to collect particulate matter contained in the exhaust gas;

an electronic control unit configured to execute PM removal control that removes the particulate matter accumulated on the filter while the internal combustion engine is stopped;

an alarm informing device configured to inform a user of the vehicle of a first alarm when:
- the electronic control unit determines that the user requests start-up of the internal combustion engine in a period from execution of the PM removal control to a lapse of a prescribed time after completion of the PM removal control, and
- the electronic control unit determines that a temperature of the filter is larger than a specified temperature; and a cooling device that cools the filter, wherein the electronic control unit is configured to stop the PM removal control when the electronic control unit determines that the user of the vehicle requests the start-up of the internal combustion engine again after the alarm informing device informs the user of the vehicle of the first alarm and while the PM removal control is in execution, and wherein the electronic control unit is configured to start the cooling device, after the PM removal control is stopped, to lower temperature of the filter.

9. A control method for a vehicle, the vehicle including a filter disposed in an exhaust passage that carries an exhaust gas discharged from an internal combustion engine, the filter being configured to collect particulate matter contained in the exhaust gas, an electronic control unit configured to execute PM removal control that removes the particulate matter accumulated on the filter while the internal combustion engine is stopped, an alarm informing device configured to inform a user of the vehicle of a first alarm, and a cooling device that cools the filter, the control method comprising:

informing, by the electronic control unit, the user of the vehicle of the first alarm using the alarm informing device when:
- the electronic control unit determines that the user requests start-up of the internal combustion engine in a period from execution of the PM removal control to a lapse of a prescribed time after completion of the PM removal control, and
- the electronic control unit determines that a temperature of the filter is larger than a specified temperature, wherein the electronic control unit is configured to stop the PM removal control when the electronic control unit determines that the user of the vehicle requests the start-up of the internal combustion engine again after the alarm informing device informs the user of the vehicle of the first alarm and while the PM removal control is in execution, and wherein the electronic control unit is configured to start the cooling device, after the PM removal control is stopped, to lower temperature of the filter.

* * * * *